(12) United States Patent
Li

(10) Patent No.: US 8,162,271 B2
(45) Date of Patent: Apr. 24, 2012

(54) SUPPORT FRAME WITH AN ADJUSTABLE MECHANISM

(76) Inventor: Chin-Chu Li, Taichung Hsien (TW)

( * ) Notice: Subject to any disclaimer, the term of this patent is extended or adjusted under 35 U.S.C. 154(b) by 53 days.

(21) Appl. No.: 12/574,703

(22) Filed: Oct. 7, 2009

(65) Prior Publication Data

US 2011/0079692 A1    Apr. 7, 2011

(51) Int. Cl.
*E04G 3/00*    (2006.01)
(52) U.S. Cl. .................. 248/162.1; 248/415; 248/284.1; 248/286.1
(58) Field of Classification Search ............... 248/162.1, 248/415, 284.1, 286.1, 631, 161
See application file for complete search history.

(56) References Cited

U.S. PATENT DOCUMENTS

| | | | |
|---|---|---|---|
| 6,857,610 B1 * | 2/2005 | Conner et al. | 248/284.1 |
| 7,195,214 B2 * | 3/2007 | Lee et al. | 248/125.8 |
| 7,195,215 B2 * | 3/2007 | Lin | 248/125.9 |
| 7,264,212 B2 * | 9/2007 | Hung | 248/282.1 |
| 7,389,963 B2 * | 6/2008 | Cho et al. | 248/159 |

* cited by examiner

*Primary Examiner* — Amy Sterling
*Assistant Examiner* — Steven Marsh
(74) *Attorney, Agent, or Firm* — Kile Goekjian Reed & McManus PLLC

(57) ABSTRACT

A support frame with an adjustable mechanism includes a fasten base, a displacement cylinder and an air pressure bar. The fasten base has a guiding cylinder. The displacement cylinder is sleeved with the guiding cylinder and has a relative motion relative to the guiding cylinder. One end of the air pressure bar is fastened with the fasten base and is located in the guiding cylinder. The displacement cylinder is fastened with another end of the air pressure bar and moves as the length of the air pressure bar changes.

5 Claims, 3 Drawing Sheets

SUPPORT FRAME WITH AN ADJUSTABLE MECHANISM

BACKGROUND OF THE INVENTION

1. Field of the Invention

The present invention relates to a support frame with an adjustable mechanism. In particular, the present invention relates to a support frame that can adjust the linear displacement by changing the length of an air pressure bar and one end of the support frame is fastened with a display screen.

2. Description of Related Art

The slim electronic devices, such as plat computers, LCDs, LCD TVs, and plasma TVs, etc, can be installed at a variety of locations, such as walls, ceilings, or desks, etc. In order to meet different installation ways according to user's demands, a lot of support frames or hold frames for supporting or holding the electronic devices are developed.

The support frames for supporting the electronic devices can be divided into a stand type and a hold type. The stand type support frame usually is located on the desk and the height and the angle of the electronic device installed on the support frame can be changed. The hold type support frame usually is located on the wall, and the electronic device installed on the support frame can change the location and the angle by using a support arm to rotate the support arm on a horizontal surface along a vertical shaft or rotate the support arm on a vertical surface along a horizontal shaft.

However, the height of the support frame cannot be changed, or the angle of the support frame has to be changed as the height of the support frame is changed. Therefore, the support frame cannot perform the linear displacement. In other words, the displacement and the angle cannot be adjusted independently. Moreover, when the support frame is received, the support arm of the support frame cannot be adjacent to the wall. The dimension of the support frame being received cannot be reduced.

Reference is made to FIG. 1. The support frame of the prior art includes a fastening base 1a, a displacement part 2a, a locking part 3a, an joint part 4a, a support arm 5a and a carrier base 6a. The fastening base 1a includes a plate body 11a and a guiding rod 12a. The guiding rod 12a is located on one surface of the plate body 11a. Another surface of the plate body 11a is used for being firmly placed on the desk. The displacement part 2a includes a connection portion 21a and two pivoting ears 22a. The displacement part 2a is connected with the guiding rod 12a via the connection portion 21a. The connection portion 21a is locked with the guiding rod 12a via the locking part 3a. The joint part 4a includes a horizontal pivoting portion 41a and a vertical pivoting portion 42a. The horizontal pivoting portion 41a is pivoted between the pivoting ears 22a. The support arm 5a includes an arm body 51a, a first pivoting portion 52a and a second pivoting portion 53a. The first pivoting portion 52a and the second pivoting portion 53a are respectively located at two ends of the arm body 51a. The vertical pivoting portion 42a is pivoted with the first pivoting portion 52a. The carrier base 6a includes a base plate 61a and a pivoting portion 62a. The base plate 61a is used for combining with a LCD (not shown in the figure). The pivoting portion 62a is pivoted with the second pivoting portion 53a.

As shown in FIG. 1, when the height is adjusted, the locking part 3a needs to be looses. Next, the LCD is adjusted to the desired height by manpower and then locking the locking part 3a. During the height is adjusted, the user needs to loose and lock the locking part 3a. It is inconvenient. Furthermore, after the locking part 3a is loosed, the user needs to support the LCD. It is inconvenient.

SUMMARY OF THE INVENTION

One particular aspect of the present invention is to provide a support frame with an adjustable mechanism. One end of the support frame is located at a solid object, and the other end of the support frame is fastened with a display screen. By changing the length of the air press bar, the linear displacement of the support frame is adjusted.

The support frame with an adjustable mechanism includes a fasten base, a displacement cylinder and an air pressure bar. The fasten base has a guiding cylinder. The displacement cylinder is sleeved with the guiding cylinder and has a relative motion relative to the guiding cylinder. One end of the air pressure bar is fastened with the fasten base and is located in the guiding cylinder. The displacement cylinder is fastened with the other end of the air pressure bar and moves as the length of the air pressure bar changes.

The present invention uses the air pressure bar to adjust the displacement of the support frame. By changing the length of the air pressure bar, the displacement of the support frame can be independently adjusted without being affected by the change of the angle. In other words, the displacement of the support frame can be independently adjusted. For example, the height and distance of the support frame can be fine-adjusted. Moreover, the support frame further has a first support arm and a second support arm. By utilizing the support arms and the pivoting mechanism located between the support arms, the usage range of the support frame is increased, and the support frame can be rotated to adjust its angle. When the support arms are received, the support arms can be crossly stacked to reduce the occupied space.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

Figure 1:
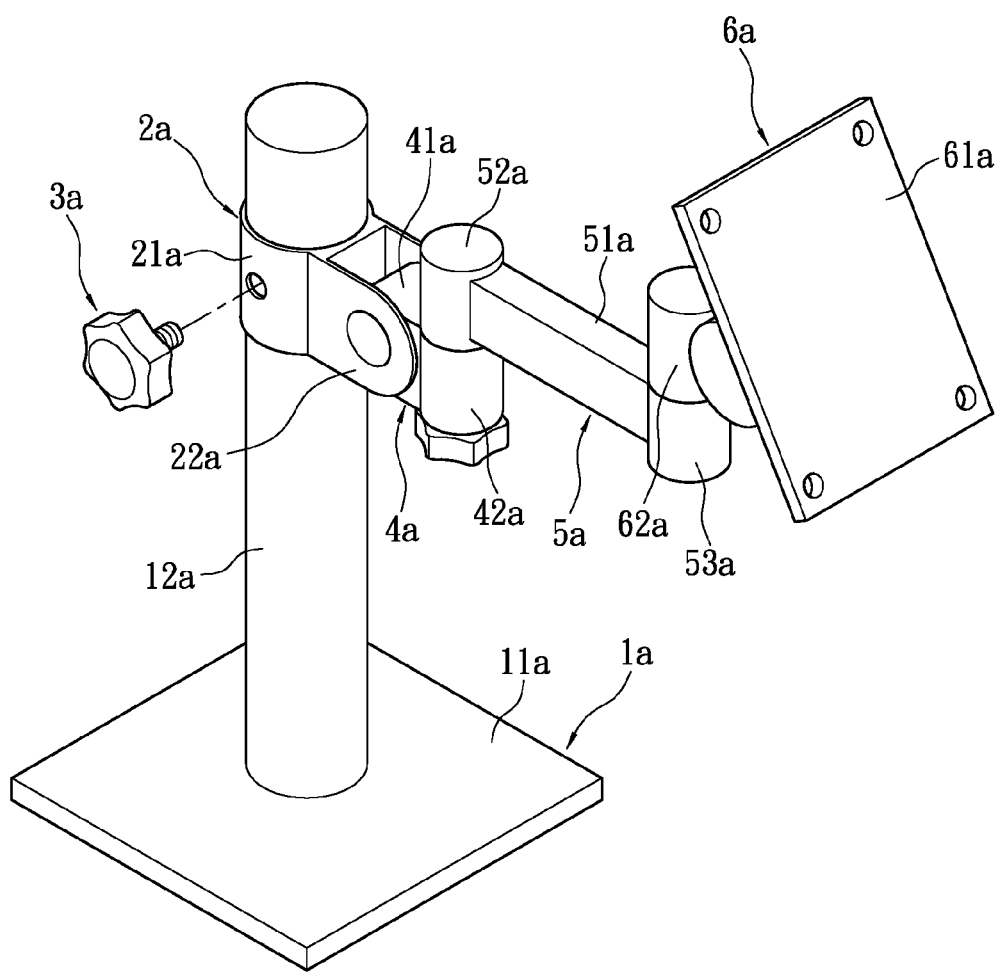
FIG. 1 is a perspective view of the support frame of the prior art.
Figure 2:
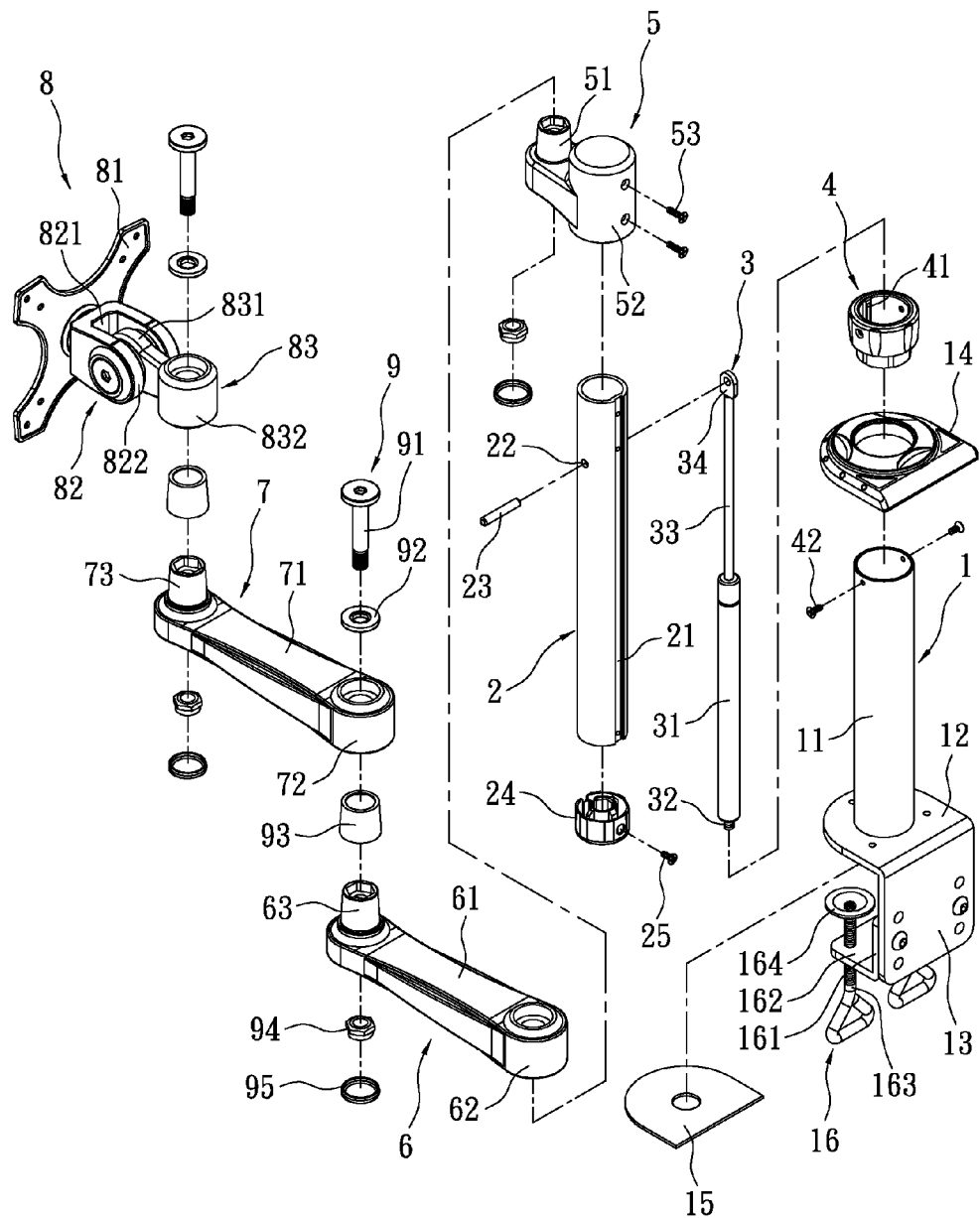
FIG. 2 is an exploded perspective view of the support frame with an adjustable mechanism of the present invention.
Figure 3:
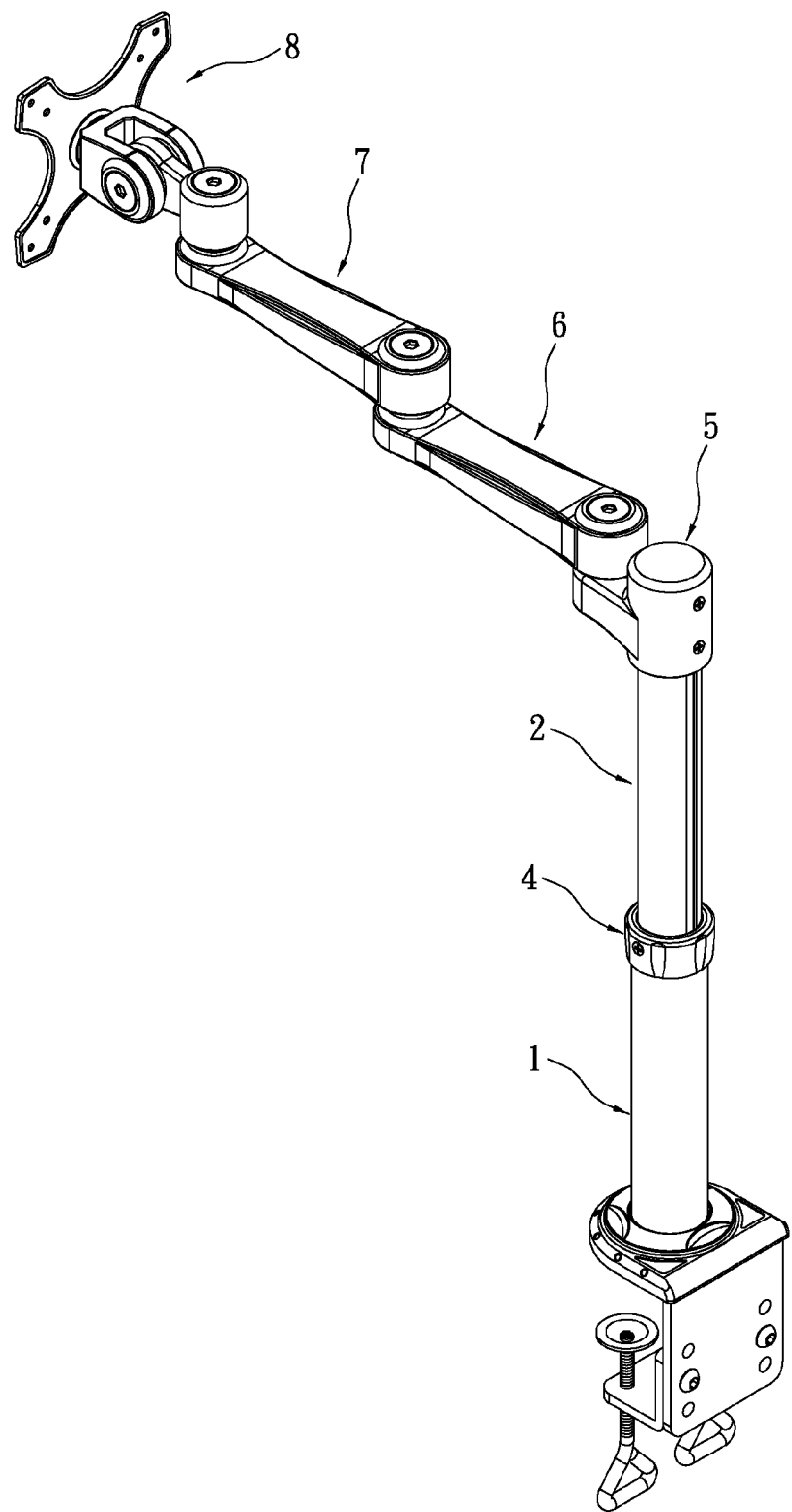
FIG. 3 is an assembly perspective view of the support frame with an adjustable mechanism of the present invention in FIG. 2.

FIGS. 2 and 3 show one embodiment of the present invention, which is used as one example for supporting LCD, but not limited to above. Reference is made to FIGS. 2 and 3. The support frame with an adjustable mechanism includes a fasten base 1, displacement cylinder 2, an air pressure bar 3, a positioning ring 4, a support base 5, a first support arm 6, a second support arm 7, a carrier base 8 and three combining sets 9.

In this embodiment, the fasten base 1 has a guiding cylinder 11, a first plate body 12, a second plate body 13, a decoration plate 14, a wear-proof pad 15 and a holding base 16. The guiding cylinder 11 is located at the first plate body 12. The second plate body 13 is vertical to the first plate body 12. The displacement cylinder 2 is sleeved with the guiding cylinder 11 and has a relative movement relative to the guiding cylinder 11. The decoration plate 14 is located upper the first plate body 12 and is sleeved with the guiding cylinder 11 for enhancing the appearance. The wear-proof pad 15 is located under the first plate body 12 to prevent the first plate body 12 from wearing with the other object to achieve the slide-proof effect. The holding base 16 has a third plate body 161, a fourth plate body 162, a screw rod 163 and an abutting part 164. The third plate body 161 is screwed with the second plate body 13. The fourth plate body 162 is vertical to the third plate body 161. The screw rod 163 is located at the fourth plate body 162 and can be rotated to adjust its length. The abutting part 164 is screwed at the upper end of the screw rod 163. By rotating the screw rod 163, the distance between the abutting part 164 and the first plate body 12 can adjusted. By using the above mechanism, the support frame is clamped at the edge of a desk by using the first plate 12 and the abutting part 164.

In this embodiment, the displacement cylinder 2 has a sliding slot 21, a pin hole 22, a bolt 23, and a cover part 24. The air pressure bar 3 has an air pressure cylinder 31, a screw boss 32, a piston rod 33 and a fasten ear 34. The inner side of the positioning ring 4 has a guide rail 41. The bolt 23 is plugged into the pin hole 22 to fasten the displacement cylinder 2 onto the fasten ear 34 so that the displacement cylinder 2 can move as the piston rod 33. The cover part 24 is sleeved with the other end of the displacement cylinder 2 for sealing the displacement cylinder 2. The screw boss 32 is located at one end of the air pressure cylinder for locking the air pressure bar 3 on the first plate body 12. Part of one end of the piston rod 33 is received in the air pressure cylinder 31 and exposes to the other end of the air pressure cylinder 31. The length of the piston rod 33 exposed to outside of the air pressure cylinder 31 can be changed to provide the linear displacement. The fasten ear 34 is located at the other end of the piston rod 33. The positioning ring 4 is located at one end of the guiding cylinder 11. The displacement cylinder 2 slides along the guide rail 41 via the sliding slot 21. However, the mechanism for sliding the displacement cylinder 2 is not limited to above, that can make the displacement cylinder 2 freely move along the direction of the length change of the air pressure bar 3. The cross-sectional shape of the guiding cylinder 11 and the displacement cylinder 2 is also not limited to a specific type.

In this embodiment, the cover part 24 further has a second screw 25. The second screw 25 passes through the outer side of the cover part 24 to lock the cover part 24 onto the displacement cylinder 2. The positioning ring 4 further has two first screws 42. The first screws 42 pass through the outer side of the positioning ring 4 to lock the positioning ring 4 onto the guiding cylinder 11. The support base 5 further has two third screws 53. The third screws 53 pass through the support base 5 to lock the support base 5 onto the displacement cylinder 2. However, the quantity of the screws and the ways for fastening parts onto the displacement cylinder 2 or guiding cylinder 11 are not limited to above.

Reference is made to FIGS. 2 and 3. In this embodiment, the support base 5 has a support pivoting portion 51 and a sleeve portion 52. The sleeve portion 52 is sleeved with one end of the displacement cylinder 2. The first support arm 6 has a first arm body 61, a first female pivoting portion 62 and a first male pivoting portion 63. The second support arm 7 has a second arm body 71, a second female pivoting portion 72 and a second male pivoting portion 73. The thickness of the first arm body 61 and the second arm body 71 becomes smaller and smaller from one end to the other end. The first female pivoting portion 62 and the second female portion 72 are respectively located at the thicker end of the first arm body 61 and the second arm body 71. The first male pivoting portion 63 and the second male pivoting portion 73 are respectively located at the thinner end of the first arm body 61 and the second arm body 71. The first female pivoting portion 62 is pivoted with the support pivoting portion 51 via the component assembly 9. The second female pivoting portion 72 is pivoted with the first male pivoting portion 63 via the component assembly 9. When the support frame is received, the second support arm 7 is stacked with the first support arm 6. Thereby, the received space is reduced, the rotation angle can be fine-adjusted, and the operation range is increased.

In this embodiment, the carrier base 8 includes a base plate 81, a linking part 82 and a joint part 83. The linking part 82 has a linking body 821 and two pivoting ears 822. The pivoting ears 822 are parallel and vertical to the linking body 821. The joint part 83 has a horizontal pivoting portion 831 and a vertical pivoting portion 832. The horizontal pivoting portion 831 and the vertical pivoting portion 832 are ring-shaped or tube-shaped. The center shaft of the horizontal pivoting portion 831 is vertical to the center shaft of the vertical pivoting portion 832. The LCD (not shown in the figure) is fastened on the base plate 81. The center of the base plate 81 is pivoted with the linking body 821. The horizontal pivoting portion 831 is pivoted between the pivoting ears 822. The vertical pivoting portion 832 is pivoted with the second male pivoting portion 73 via the component assembly 9. Therefore, the LCD (not shown in the figure) can be rotated or moved to change the viewing angle along three center shafts that are vertical to each other.

As shown in FIG. 2, in this embodiment, the component assembly 9 includes a screw 91, a washer 92, a shaft bush 93, a nut 94 and a protection cover 95. The protection cover 95 is used for covering exposed part of the component assembly 9 when the component assembly 9 is combined. However, in other embodiment, the structure of the component assembly 9 is not limited to above. The component assembly 9 is used for firmly pivoting the elements, and can have different structure.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A support frame with an adjustable mechanism, comprising:
   a fasten base having a guiding cylinder;
   a displacement cylinder sleeved with the guiding cylinder and having a relative motion relative to the guiding cylinder;
   an air pressure bar, wherein one end of the air pressure bar is fastened with the fasten base and is located in the guiding cylinder, and the displacement cylinder is fastened with the other end of the air pressure bar and moves as the length of the air pressure bar changes; and
   a positioning ring, located at one end of the guiding cylinder, wherein the inner side of the positioning ring has a guide rail, the exterior of the displacement cylinder has a sliding slot, and the displacement cylinder slides along the guide rail via the sliding slot.

2. The support frame with an adjustable mechanism as claimed in claim 1, further comprising a support base, wherein the support base has a support pivoting portion and a sleeve portion, and the sleeve portion is sleeved with one end of the displacement cylinder.

3. The support frame with an adjustable mechanism as claimed in claim 2, further comprising a first support arm, wherein one end of the first support arm is pivoted with the support pivoting portion.

4. The support frame with an adjustable mechanism as claimed in claim 3, further comprising a second support aim, wherein one end of the second support arm is pivoted with the other end of the first support arm.

5. The support frame with an adjustable mechanism as claimed in claim 4, further comprising a carrier base, wherein one end of the carrier base is pivoted with the other end of the second support arm.

* * * * *